United States Patent [19]
Braun

[11] 3,966,260
[45] June 29, 1976

[54] PRESTRESSED AXLE BEAM

[75] Inventor: Eugene R. Braun, Royal Oak, Mich.

[73] Assignee: Eaton Corporation, Cleveland, Ohio

[22] Filed: Jan. 7, 1975

[21] Appl. No.: 539,136

[52] U.S. Cl. .......................... 301/127; 301/124 R; 72/701
[51] Int. Cl.² ...................................... B60B 35/00
[58] Field of Search ............... 301/124 R, 125, 127, 301/129; 29/446; 72/701, 702, 362, 364, 365, 367, 369

[56] References Cited
UNITED STATES PATENTS

| | | | |
|---|---|---|---|
| 775,807 | 11/1904 | Einfeldt | 301/125 |
| 1,899,347 | 2/1933 | Mogford | 301/124 R |
| 3,130,614 | 4/1964 | Nachtman | 72/701 |

FOREIGN PATENTS OR APPLICATIONS

| | | | |
|---|---|---|---|
| 21,777 | 10/1900 | Austria | 301/129 |

Primary Examiner—Stanley H. Tollberg
Assistant Examiner—D. W. Keen
Attorney, Agent, or Firm—Teagno & Toddy

[57] ABSTRACT

A nondriven axle suitable for use on trailers, trucks and the like is strengthened by plastically deforming at least a portion of the axle beam to form residual stresses in the axle beam which will resist loads impressed on the axle by the vehicle.

5 Claims, 3 Drawing Figures

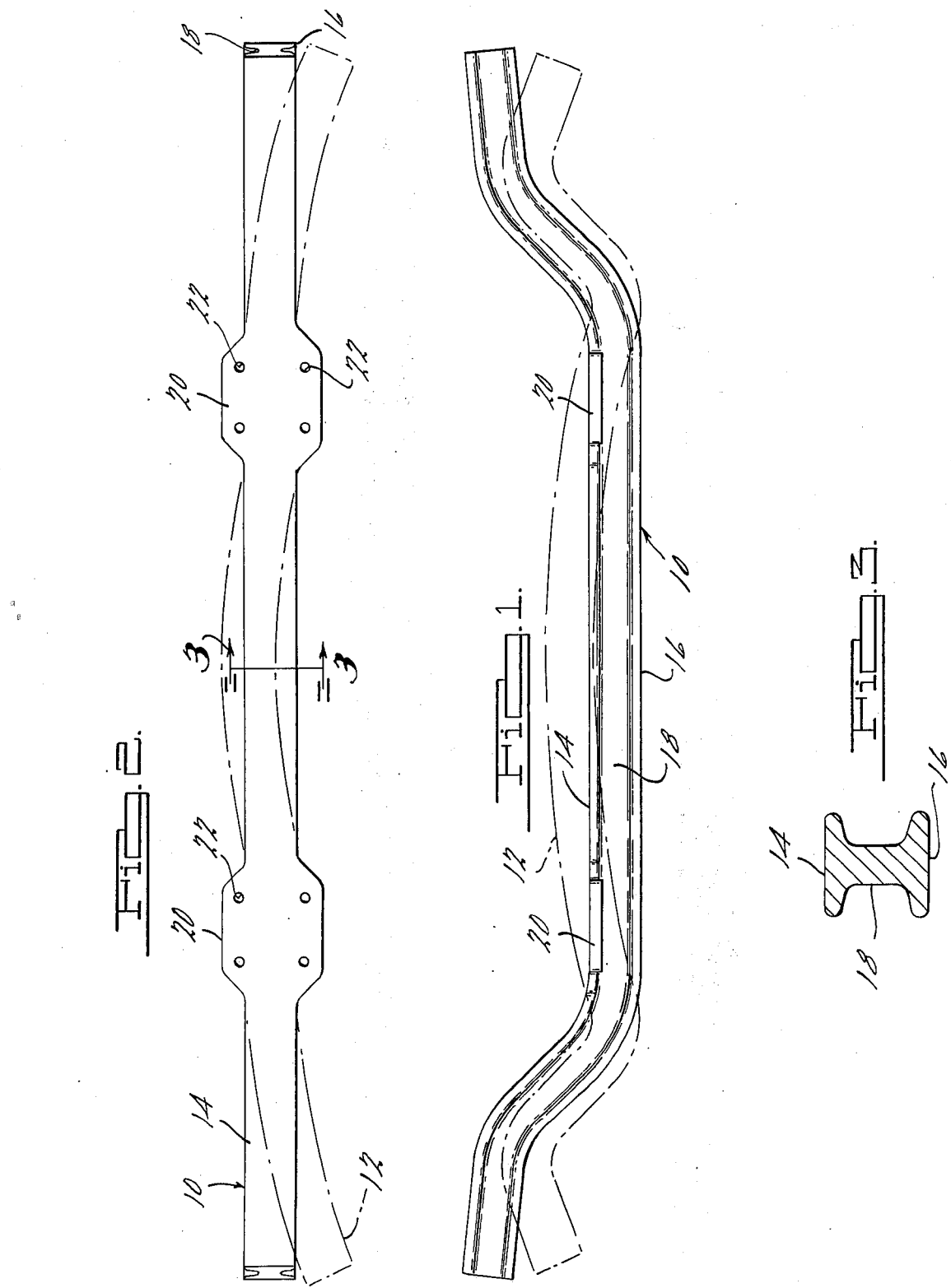

PRESTRESSED AXLE BEAM

BACKGROUND OF THE INVENTION

1. Field of the Invention

In one aspect this invention relates to steering axles for trucks and the like. In another aspect, this invention relates to nondriven axles for vehicles and trailers.

2. Prior Art

Nondriven axles of forged steel having a solid I-beam configuration have been used on trucks and trailers for many years.

The dimensions of prior art axles have been primarily determined by the weight of the vehicle to which they were attached and the anticipated maximum static load which they were expected to carry. When the weight on an axle was increased the axle's strength had to be increased a proportional amount. This was accomplished by increasing the amount of material in the axle beam or by using higher strength materials.

Increasing the material in an axle beam increases manufacturing costs due to increased material costs and the additional weight will increase operating costs by increasing fuel consumption.

Using high strength materials, e.g., precipitation hardening alloys, increases the manufacturing cost of an axle several fold. High strength materials are considerably more expensive than the ordinary forging steels commonly used in nondriven axles. Also, high strength materials may require expensive processing and the additional processing step of heat treatment to fully develop their strength.

It is an object of this invention to furnish a nondriven axle beam which can bear an increased load without increased mass or without recourse to higher strength materials.

It is a further object of this invention to provide a nondriven axle beam with increased resistance to shock failure.

Moreover, it is an object of this invention to provide a stronger nondriven axle beam made from ordinary forging steels.

SUMMARY OF THE INVENTION

Briefly the problems of the prior art are met by a nondriven axle comprising a beam section in which at least a portion of the axle beam has been plastically strained beyond its elastic limit. The resulting axle beam has residual stresses therein. When the axle beam is attached to a vehicle and is loaded, the stresses due to loading are at least partially neutralized by the residual stresses which allows the prestressed axle beam to carry an increased load.

BRIEF DESCRIPTION OF THE DRAWINGS

The accompanying drawing shows one embodiment of the present invention in which:

FIG. 1 is a side elevational view of a nondriven axle beam;

FIG. 2 is a top plan view of the axle beam of FIG. 1; and

FIG. 3 is a cross-sectional view of FIG. 2 taken along the line 3—3.

DETAILED DESCRIPTION OF THE PREFERRED EMBODIMENTS

Referring to the accompanying drawing in which like reference numerals refer to like parts, a nondriven axle beam 10 having an I-shaped cross section with an upper flange 14, lower flange 16 and a central web 18 is shown. The axle beam 10 has 2 flat surfaces 20 with apertures 22 which provide means for attaching a vehicle to the axle. Wheels can be mounted on the ends of axle beam 10 using conventional means.

Such axle beams are commonly made by hot forging steel bars or sections to the desired configuration. The still hot forged axle beam is then mechanically clamped in the desired configuration and quenched. Generally only minor working will be needed to bring the axle beam to the desired final dimensions. This process produces an essentially unstressed axle beam of the desired configuration.

To form the axle beam of this invention an axle beam preform 12 is forged to a configuration different from the finished product. One possible configuration is shown by the phantom lines on FIGS. 1 and 2. The axle beam preform can be produced in this configuration by the same techniques used to produce a conventional axle beam.

After the axle beam preform 12 has been produced in the nonconventional configuration the axle beam is plastically deformed to its final configuration. The plastic deformation leaves residual stresses in the finished axle beam. The preform has a configuration such that the residual stresses produced during plastic deformation are opposite the stresses placed on the axle beam by normal operating stresses such as supporting a vehicle. That is, since the upper flange 14 of the axle beam is normally in compression the residual stress in the upper flange should be tensile and the lower flange 18 which normally has tensile stresses when loaded should have compressive residual stresses. Because the operating stresses and prestress have a tendancy to cancel each other, larger stresses such as those due to an increased static load can be placed on the prestressed axle of this invention.

FIG. 1 shows an axle beam preform where the prestresses resulting from plastic deformation will counteract the vertical stresses caused by a vehicle. However, it is also possible to prestress an axle beam in the horizontal direction such as by deforming preform 12 as shown in FIG. 2. The resulting stressed axle beam has a combined prestress vector with both horizontal and vertical components. The combined stress vector will act to cancel operating stresses with components in the horizontal direction such as forces caused by braking or the vehicle wheel passing over a discontinuity in the road.

The prestress is formed in the axle beam by stressing the material beyond its elastic limit at room temperature without stress relieving the stressed material. One method for plastically deforming the axle beam preform is by supporting the axle at two points and deforming the area between the supports by means of a ram or other suitable force. The axle beam preform can also be shaped by using rollers alternately positioned on each side of the axle beam. Applying pressure to the rollers and moving the axle beam back and forth between the rollers will deform the axle beam. Other metal working methods which will plastically deform the axle beam preform into the desired configuration can also be used, such methods being within the skill of the art.

Prestressing markedly increases an axles load carrying capacity. For example, highway trucks often use a 12,000 pound rated axle. That is, the static vertical load on the front axle of the truck should be 12,000 pounds or less. Such axles have an axle beam which normally weighs 215 pounds. By prestressing the axle beam the weight of such an axle beam can be reduced to about 185 pounds which represents a reduction in the beam's dead weight of about 15 per cent. This weight savings can have a significant effect on the cost of buying and operating the truck by reducing the material necessary to make the axle and eliminating nonproductive dead weight.

The increase in static load rating of a prestressed axle beam is a function of the amount of difference between the preformed shape and the final shape. The more that an axle beam preform has to be plastically deformed to achieve the final shape the more residual stress will be present in the finished axle beam.

A preferred method would be to have the preform made such that the final shape is achieved by deforming the beam at a nearly constant load indicating that a maximum amount of material has been yielded maximizing the amount of residual stress and increased load capacity.

It can be seen from the foregoing description that the desired objects are achieved by the present invention. Various alterations will become obvious to those skilled in the art without departing from the scope and spirit of this invention.

What is claimed is:

1. In a non driven axle suitable for supporting a vehicle thereon and comprising a one-piece beam section having means near each end of the beam for attachment of the axle to the vehicle, the improvement wherein the beam, when in an unloaded state, has a tensile residual stress in the top portion and a compressive residual stress in the bottom portion so that when the axle is loaded during use the loading stresses on said axle will be partially neutralized by the residual stresses present in the unloaded beam.

2. The axle of claim 1 wherein the beam is an I-beam.

3. A method of forming a prestressed nondriven axle wherein at least a portion of the axle has residual stress therein comprising the steps of: forming a nondriven one-piece axle with a configuration different from the desired finished axle configuration; and deforming the axle to its final configuration by plasticly deforming at least a portion of the axle in a manner to impart compressive residual stresses adjacent one surface thereof and residual tensile stresses adjacent the opposite surface.

4. The method of claim 3 where the axle is deformed by means of rolls.

5. The method of claim 3 wherein said axle is formed with a configuration that is different in each of two planes from its desired finished axle configuration and wherein said deforming step includes plastic deformation in each of said planes.

* * * * *